(12) United States Patent
Hanzawa et al.

(10) Patent No.: US 7,553,078 B2
(45) Date of Patent: Jun. 30, 2009

(54) TEMPERATURE SENSOR AND METHOD FOR PRODUCING THE SAME

(75) Inventors: Go Hanzawa, Aichi (JP); Masahiko Nishi, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 114 days.

(21) Appl. No.: 11/178,378

(22) Filed: Jul. 12, 2005

(65) Prior Publication Data
US 2006/0013282 A1    Jan. 19, 2006

(30) Foreign Application Priority Data
Jul. 16, 2004    (JP)    ............... 2004-210500

(51) Int. Cl.
G01K 1/16    (2006.01)
G01K 7/16    (2006.01)
G01K 13/00    (2006.01)

(52) U.S. Cl. .................. 374/185; 374/144; 374/163; 338/22 R; 338/28

(58) Field of Classification Search ................ 374/141, 374/142, 144, 208, 163, 183, 185, 148, 179; 338/22 R, 25, 28
See application file for complete search history.

(56) References Cited

U.S. PATENT DOCUMENTS

| | | | | |
|---|---|---|---|---|
| 4,442,420 A | * | 4/1984 | Novak ........................... | 338/34 |
| 4,603,026 A | * | 7/1986 | Martin ................... | 264/272.18 |
| 5,481,240 A | | 1/1996 | Fukaya et al. | |
| 6,130,598 A | * | 10/2000 | Katsuki et al. ................. | 338/28 |
| 6,286,995 B1 | * | 9/2001 | Takahashi et al. ........... | 374/148 |
| 6,305,841 B1 | * | 10/2001 | Fukaya et al. ................ | 374/185 |
| 6,466,123 B1 | * | 10/2002 | Kuzuoka et al. .............. | 338/25 |
| 6,639,505 B2 | * | 10/2003 | Murata et al. ................. | 338/25 |
| 6,899,457 B2 | * | 5/2005 | Kurano ........................ | 374/185 |
| 6,997,607 B2 | * | 2/2006 | Iwaya et al. ................. | 374/208 |
| 7,104,685 B2 | * | 9/2006 | Hanzawa et al. ............ | 374/208 |
| 7,121,722 B2 | * | 10/2006 | Hanzawa et al. ............ | 374/185 |
| 2002/0061049 A1 | * | 5/2002 | Adachi et al. ................ | 374/208 |
| 2002/0067243 A1 | * | 6/2002 | Noli ............................. | 338/25 |
| 2002/0084884 A1 | * | 7/2002 | Takahashi et al. ............. | 338/25 |
| 2002/0135454 A1 | * | 9/2002 | Ichida et al. .................. | 338/25 |

(Continued)

FOREIGN PATENT DOCUMENTS

CN    2394205    8/2000

(Continued)

Primary Examiner—Gail Verbitsky
(74) Attorney, Agent, or Firm—Sughrue Mion, PLLC

(57) ABSTRACT

A temperature sensor 10 includes a metallic cover 5, a thermistor element 1 accommodated in a front portion 5s of the metallic cover 5, first and second conductive wires 2a and 2b extending rearwards of the thermistor element 1 and transmitting a signal therefrom, a MI cable 4 in which first and second core wires 4a and 4b are positioned and having a front end thereof inserted into the metallic cover 5, and an insulating holder 3 situated between the thermistor element 1 and the front end of the MI cable 4 in the metallic cover 5. The insulating holder 3 holds the first and second conductive wires 2a and 2b and corresponding first and second core wires 4a and 4b, respectively. The conductive wires and the corresponding core wires are connected to each other in the insulating holder 3. Furthermore, the thermistor element 1 and the insulating holder 3 are fixed by means of cement 6.

7 Claims, 10 Drawing Sheets

U.S. PATENT DOCUMENTS

| | | | |
|---|---|---|---|
| 2004/0141545 A1* | 7/2004 | Hoshisashi et al. | 374/208 |
| 2005/0175067 A1* | 8/2005 | Chu | 374/208 |
| 2007/0104247 A1* | 5/2007 | Takahashi | 374/185 |
| 2007/0171959 A1* | 7/2007 | Irrgang et al. | 374/185 |
| 2007/0195857 A1* | 8/2007 | Krishnamurthy et al. | 374/148 |
| 2008/0080592 A1* | 4/2008 | Houben et al. | 374/185 |
| 2008/0205484 A1* | 8/2008 | Toudou et al. | 374/185 |

FOREIGN PATENT DOCUMENTS

| | | |
|---|---|---|
| DE | 198 53 668 A1 | 11/1998 |
| DE | 101 57 068 A1 | 11/2001 |
| JP | 11-218449 A | 8/1999 |
| JP | 2002-267547 A | 9/2002 |
| JP | 2004-233236 A | 8/2004 |

* cited by examiner

TEMPERATURE SENSOR AND METHOD FOR PRODUCING THE SAME

BACKGROUND OF THE INVENTION

1. Field of the Invention

The present invention relates to a temperature sensor having a temperature sensor element surrounded by a metallic cover, and to a method for producing the temperature sensor.

2. Description of the Related Art

Patent Document 1 discloses a temperature sensor having a metallic cover, a cylindrical insulator surrounded by the metallic cover, a thermistor element disposed in the cylindrical insulator, and an inorganic adhesive agent filled in the cylindrical insulator. However, due to recent demand for a temperature sensor which can generate sensor signals highly responsive to ambient temperature changes, the temperature sensor disclosed in Patent Document 2 has been developed. This sensor, in which an insulator or an inorganic adhesive agent filled therein are omitted, has a metallic cover of smaller external diameter so that the distance between the metallic cover and a temperature sensor element is reduced. In Patent Document 2, the metallic cover has a stepped-shape front portion of smaller inner diameter than the external diameter of a front end of a sheath pin (MI or mineral insulated cable) 5. On the other hand, in Patent Document 2, the electrode wires are separated by means of an insulator that avoids electrode wire breakage due to vibration of a thermistor element (temperature sensor element).

[Patent Document 1] Japanese Patent Application Laid-Open (kokai) No. H11-218449 (FIG. 1 on page 4)

[Patent Document 2] Japanese Patent Application Laid-Open (kokai) No. 2002-267547 (FIGS. 2 and 3 on page 3)

3. Problems to be Solved by the Invention

However, because the temperature sensor of Patent Document 2 requires its insulator member to be inserted into a metallic cover, the external diameter of the insulator member 6 is restricted in size so as to be smaller than the internal diameter of a portion corresponding to the metallic cover (the front portion in Patent Document 2). As a result, a gap remains between the metallic cover and the insulator member. When the temperature sensor is subjected to vibration, the electrode wires are prone to break in a region between the temperature sensor and the insulator member due to independent vibration of the temperature sensor and the insulator member in the metallic cover.

SUMMARY OF THE INVENTION

The present invention has been accomplished in view of the foregoing problems of the prior art, and an object of the present invention is to provide a temperature sensor having a high tolerance to vibration so as to resist breakage of conductive wires, as well as a temperature sensor which maintains quick response to ambient temperature changes, and to provide a method for producing a temperature sensor having a high vibration tolerance.

The above objects of the present invention have been achieved by providing a temperature sensor comprising: a cylindrical shaped metallic cover having a closed front end and a bottom; a temperature sensor element accommodated in the front portion of said metallic cover; one or more conductive wires extending rearwards of the temperature sensor element and transmitting a signal therefrom; a MI cable located in a rear end of the temperature sensor element, including at least core wires therein corresponding to said one or more conductive wires, respectively, and said MI cable having a front end inserted into the metallic cover; and an insulating holder located between the rear end of the temperature sensor element and the front end of the MI cable in the metallic cover, and holding the conductive wires and the core wires extending forward of the MI cable, wherein the conductive wires and the corresponding core wires are connected to each other in the insulating holder; wherein an internal diameter of the front portion of the metallic cover is smaller than an external diameter of the front end of the MI cable; and wherein the temperature sensor element and the insulating holder are fixed to each other by means of adhesive material present at least therebetween.

In the temperature sensor of the present invention, the temperature sensor element and the insulating holder are fixed by means of the adhesive material. By integrating the temperature sensor element and the insulating holder, the temperature sensor is able to withstand external vibration. Thus, the conductive wires, extending rearward of the temperature sensor element and being held by the insulating holder, are protected from breakage due to external stress applied thereto, especially in a gap (space) between the temperature sensor element and the insulating holder. In addition, because the front portion of the metallic cover which accommodates the temperature sensor has a small diameter, the temperature sensor can quickly respond to ambient temperature changes.

The temperature sensor of the present invention is suitable for applications subject to external vibration, especially automotive applications. The temperature sensor can be adapted for use at various points of a vehicle, such as in an exhaust pipe for measuring exhaust gas temperature, in a radiator or a coolant pipe of an engine for measuring a coolant temperature, or in a hydrogen distribution pipe of a fuel-cell vehicle for measuring hydrogen gas temperature. Namely, the temperature sensor is preferably adapted for mounting in the above-mentioned automotive structures. The temperature sensor element of the temperature sensor of the present invention can be, for example, a temperature sensitive element composed of metal oxide ceramic such as a thermistor element. Further, when a thermistor element is employed, a columnar or hexagonal columnar shape for the thermistor element can be selected, for example, without particular limitation.

The number of conductive wires should correspond to the output format of the temperature sensor element. For instance, the thermistor element normally requires a pair of conductive wires (two wires). Materials of the first and second conductive wires can be selected depending on the type or material of the temperature sensor. When the thermistor element is used as a temperature sensor element, a noble metal wire such as Pt or Pt—Rh, Dumet wire, copper wire, or nickel wire can be employed. Also, the material for the insulating holder can be appropriately selected in consideration of the temperature range that the temperature sensor is exposed to. For example, ceramic such as alumina or mullite, etc., or glass material can be used. If the temperature sensor is used in a temperature range of 100° C. to 200° C., an insulating holder composed of a thermosetting resin, such as epoxy resin or polyimide resin, etc., or a thermoplastic resin such as fluorocarbon resin, polyamide, polyethylene resin, etc., can be used. Preferably, the outer diameter d of the insulating holder can be set so as to be slightly smaller than the internal diameter D of a portion of the metallic cover where the insulating holder is inserted. Preferably, the relationship: $D-d \leq 0.2$ mm is satisfied. Due to the reduced diameter difference between the insulating holder and the portion of the metallic cover where the insulating holder is inserted, the gap for vibration of the insulating holder can be limited and, furthermore, the risk of breakage due to the vibration of the insulating holder can be further reduced.

The adhesive material can be selected in consideration of the temperature range that the temperature sensor is exposed to, the materials of temperature sensor element, insulating holder, conductive wire, metallic cover, etc., and the solidification conditions (temperature, atmosphere, etc.). For example, cement (inorganic adhesive) including ceramic powders and a glass component can be used. Further, if the temperature sensor is used in a temperature range of 100° C. to 200° C., a thermosetting resin or thermoplastic resin can be used as the adhesive material. Moreover, the MI cable (mineral insulated cable) can assume the structure of a cable having a sheath composed of a metallic tube, core wires inserted into the sheath, and a insulating inorganic ceramic powder filled in the sheath. The insulating inorganic ceramic powder insulates the core wires from the sheath and also the core wires from each other. In Patent Documents 1 and 2, the MI cable is referred to as a sheath pin.

The MI cable includes core wires made of, for example, stainless steel, copper, nickel, etc., a metallic sheath (metallic tube) made of stainless steel or copper which surrounds the core wires, and an inorganic powder, e.g., ceramic powders of silica, alumina, magnesia, etc., which are filled between the core wires and the sheath.

Furthermore, in the temperature sensor of the present invention, preferably, the adhesive material has insulation properties (i.e., is an electrical insulator) and surrounds at least a portion of the conductive wires arranged between the temperature sensor element and the insulating holder. Thus, even though the adhesive material comes into contact with the conductive wires, a short circuit failure is unlikely to occur. Moreover, because a portion of the conductive wires arranged between the temperature sensor element and the insulating holder is surrounded by the adhesive material, the first and second conductive wires are unlikely to be bent, whereby, breakage of the conductive wires can be prevented.

Furthermore, in the temperature sensors described above, preferably, the insulating holder and the MI cable are fixed by means of a second adhesive material provided at least therebetween.

In the temperature sensor of the present invention, the MI cable whose front portion is inserted into the metallic cover and the insulating holder are fixed by means of the second adhesive material. As a result, the insulating holder and the MI cable are unlikely to vibrate independently even when subjected to external vibration. Consequently, core wire breakage is prevented due to load concentration on the region (space) between the insulating holder and the MI cable (its sheath) of the core wires extending forward of the MI cable and held by the insulating holder.

Notably, the second adhesive material can be selected in consideration of the temperature range that the temperature sensor is exposed to, the materials of insulating holder, metallic cover the sheath of MI cable, core wires, inorganic ceramic power to be filled in the sheath, and the solidification conditions (temperature, atmosphere, etc.). For example, cement (inorganic binder) including ceramic powders and a glass component, a thermosetting resin or a thermoplastic resin can be used as the adhesive material. Specifically, the same adhesive material used to fix the temperature sensor element and the insulating holder is preferably used to fix the insulating holder and the MI cable. This is because its handling and solidification conditions are the same.

Furthermore, in the temperature sensor of a preferred embodiment of the present invention, the second adhesive material has insulation properties (i.e., is an electrical insulator) and preferably surrounds a portion of the core wires arranged between the insulating holder and the MI cable. Thus, even though the second adhesive material comes into contact with the core wires, a short circuit failure is unlikely to occur. Further, in the temperature sensor of the present invention, because a portion of the core wires arranged between the insulating holder and the MI cable is surrounded by the second adhesive material, the core wires are unlikely to be bent, whereby breakage of the core wires is prevented.

Further, in the temperature sensors described above, preferably, the temperature sensor element and the insulating holder are fixed to the metallic cover by means of an adhesive material provided among the metallic cover, the temperature sensor element and the insulating holder.

In the temperature sensor of the present invention, because the temperature sensor element and the insulating holder are fixed not only to each other but also to the metallic cover by means of the adhesive material, the temperature sensor element and the insulating holder are not likely to vibrate in the metallic cover when subjected to external vibration. Therefore, the risk of the conductive wires breaking is further reduced, since the conductive wires extending rearward of the temperature sensor element are protected from external stress. Moreover, heat can be more effectively conducted from the metallic cover to the temperature sensor element through the adhesive material as compared to the case where a gap (air) is present between the metallic cover and the temperature sensor element.

In the temperature sensor of the present invention, the adhesive material at least fixes the temperature sensor element and the insulating holder to the metallic cover and does not necessarily cover the entire circumference of the temperature sensor element or the insulating holder. Also the temperature sensor element and the insulating holder are at least fixed to the metallic cover and the adhesive material is not necessarily adhered to the metallic cover. The adhesive material at least contacts the temperature sensor element and the insulating holder to position the same.

In the temperature sensor according to another preferred embodiment of the present invention, preferably, the temperature sensor element is embedded in the adhesive material and fixed to the metallic cover. Therefore, not only is the temperature sensor secured so as to be fixed to the metallic cover, but also heat is effectively conducted from the metallic cover through the adhesive material, whereby the responsiveness of the temperature sensor element, and thus that of the temperature sensor, is further improved.

In another aspect, the present invention provides a method for producing a temperature sensor, the temperature sensor comprising: a cylindrical shaped metallic cover having a closed front end; a temperature sensor element accommodated in the front portion of said metallic cover; one or more conductive wires extending rearwards of the temperature sensor element and transmitting a signal therefrom; and an insulating holder located rearward of the temperature sensor element in the metallic cover and holding the conductive wires. The method includes: providing an unhardened adhesive material between at least the temperature sensor element and the insulating holder in which the conductive wires are positioned; fixing the temperature sensor element and the insulating holder to each other by hardening the adhesive material provided therebetween; and inserting the temperature sensor element and the insulating holder into the metallic cover.

Various methods can be used to produce a temperature sensor in which the temperature sensor element and the insulating holder are fixed to each other in the metallic cover. For example, an unhardened adhesive material can be filled in the metallic cover beforehand so that the adhesive material is solidified after the temperature sensor, the conductive wires and the insulating holder which holds the conductive wires are inserted into the metallic cover. Or the temperature sensor, the conductive wires and the insulating holder holding the conductive wires therein are inserted into the metallic cover beforehand, and then the adhesive material is filled in the metallic cover to be solidified. However, the above methods can be problematic, since control for suitably positioning an adequate amount of adhesive material in a requisite position in the metallic cover is required.

On the other hand, according to the above method for producing the temperature sensor of the present invention, the unhardened adhesive material is provided between at least the temperature sensor element and the insulating holder and solidified to fix the temperature sensor element and the insulating holder to each other. Then, this assembly is inserted into the metallic cover. Namely, in accordance with the method of the present invention, even the small gap between the temperature sensor element and the insulating holder, is filled with the adhesive material so as to surely fix the same. Further, this method requires a lesser amount of the adhesive material. Moreover, once the temperature sensor element and the insulating holder are fixed, the conductive wires located therebetween are unlikely to be bent when subjected to external vibration. Consequently, the risk of the conductive wires breaking is largely avoided.

In addition, following solidification of the adhesive material located between the temperature sensor element and the insulating holder, additional unhardened adhesive material can be filled in the metallic cover before or after inserting the fixed assembly of temperature sensor element and the insulating holder. Then, the additional unhardened adhesive material can be solidified to fix the fixed assembly of temperature sensor element and the insulating holder to the metallic cover. In this case, the temperature sensor element and the insulating holder are securely fixed to each other since the adhesive material is located therebetween and solidified in advance.

DESCRIPTION OF REFERENCE NUMERALS

Figure 1:
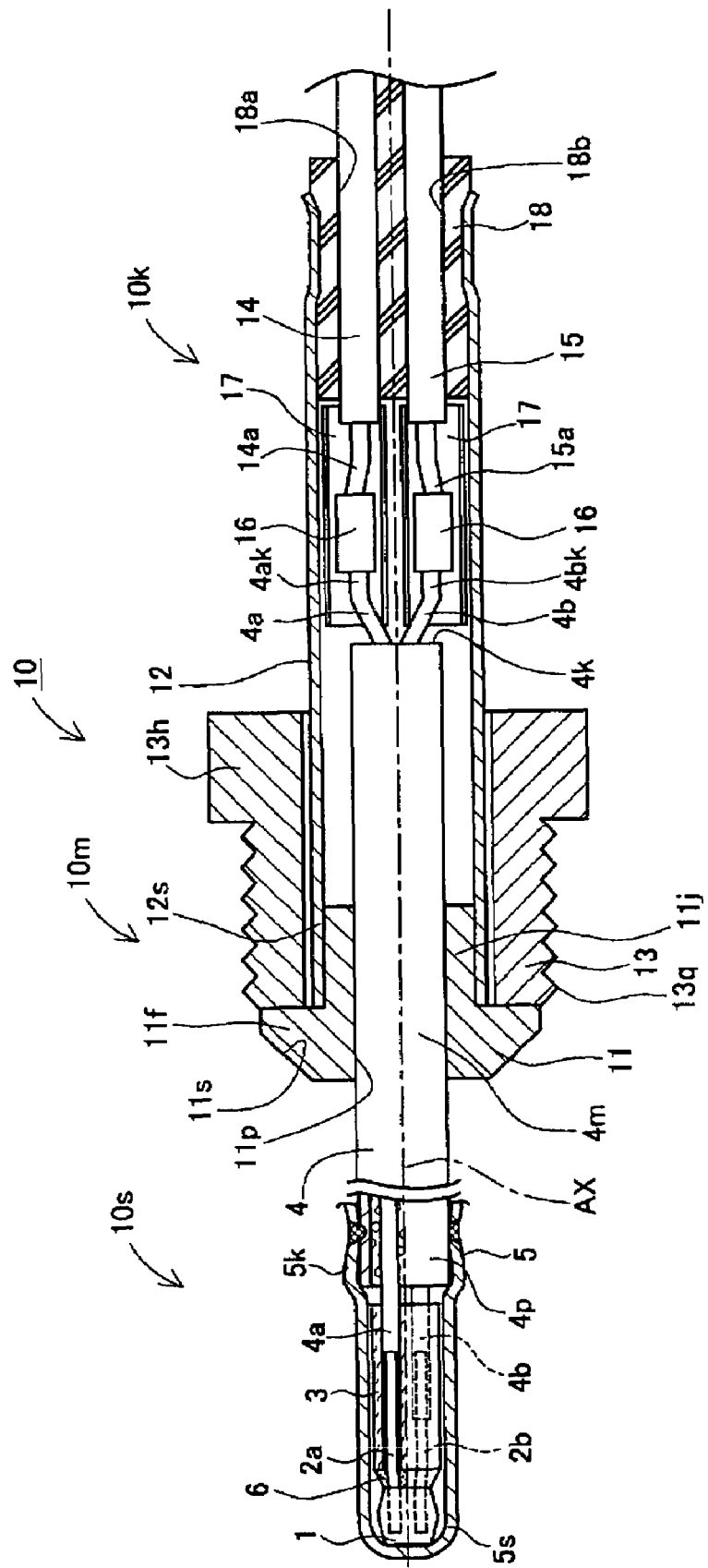
FIG. 1 is a vertical section showing the structure of the temperature sensor according to a first embodiment of the invention.

Reference numerals used to identify structural features shown in the drawings include the following:
10, 210, 310: temperature sensor
AX: axis
10$s$, 210$s$, 310$s$: temperature-sensing portion of temperature sensor
1: thermistor element (temperature sensor element)
1$k$: rear surface of thermistor element
2$a$: first conductive wire
2$ab$: intermediate portion of first conductive wire
2$b$: second conductive wire
2$bb$: intermediate portion of second conductive wire
3, 43, 53, 63: insulating holder
3$s$: front surface of insulating holder
3$k$: rear surface of insulating holder
4: MI cable
4$p$: front portion of MI cable
dm: outer diameter of front portion of MI cable
4$c$: sheath
4$cs$: front peripheral rim
4$a$: first core wire
4$b$: second core wire
4$i$: inorganic insulation powders
4$s$: front surface of MI cable
5: metallic cover
5$s$: front portion of metallic cover
5$si$: inner circumferential surface of front portion of metallic cover
5$d$: stepped portion
5$k$: rear portion of metallic cover
6, 26, 36: cement(adhesive material, second adhesive material)
11: metallic shell
12: external cylinder
13: threaded clamp
14: first lead
15: second lead
16: connecting part
17: insulation tube
18: grommet

DETAILED DESCRIPTION OF THE PREFERRED EMBODIMENTS

A temperature sensor according to an embodiment of the present invention will next be described with reference to example embodiments 1 to 3 below. However, the present invention should not be construed as being limited thereto.

1. First Embodiment

First, a temperature sensor according to a first embodiment will be described with reference to FIGS. 1 to 6. The temperature sensor 10 of the embodiment illustrated in FIG. 1 is, for example, adapted for mounting in an exhaust pipe of an automobile for measuring exhaust gas temperature or in a radiator or a coolant pipe of an engine for measuring coolant temperature.

The temperature sensor 10 includes, along the axis AX from the tip-end-side (left hand side in the drawing): a temperature-sensing portion 10s that measures the temperature; an intermediate portion 10m situated rearward of the temperature-sensing portion 10s and including a metal holder 11 for mounting the temperature sensor 10 in another apparatus; and a rear portion 10k situated rearward of the intermediate portion 10m and comprising the first and second leads extending rearward.

Figure 2:
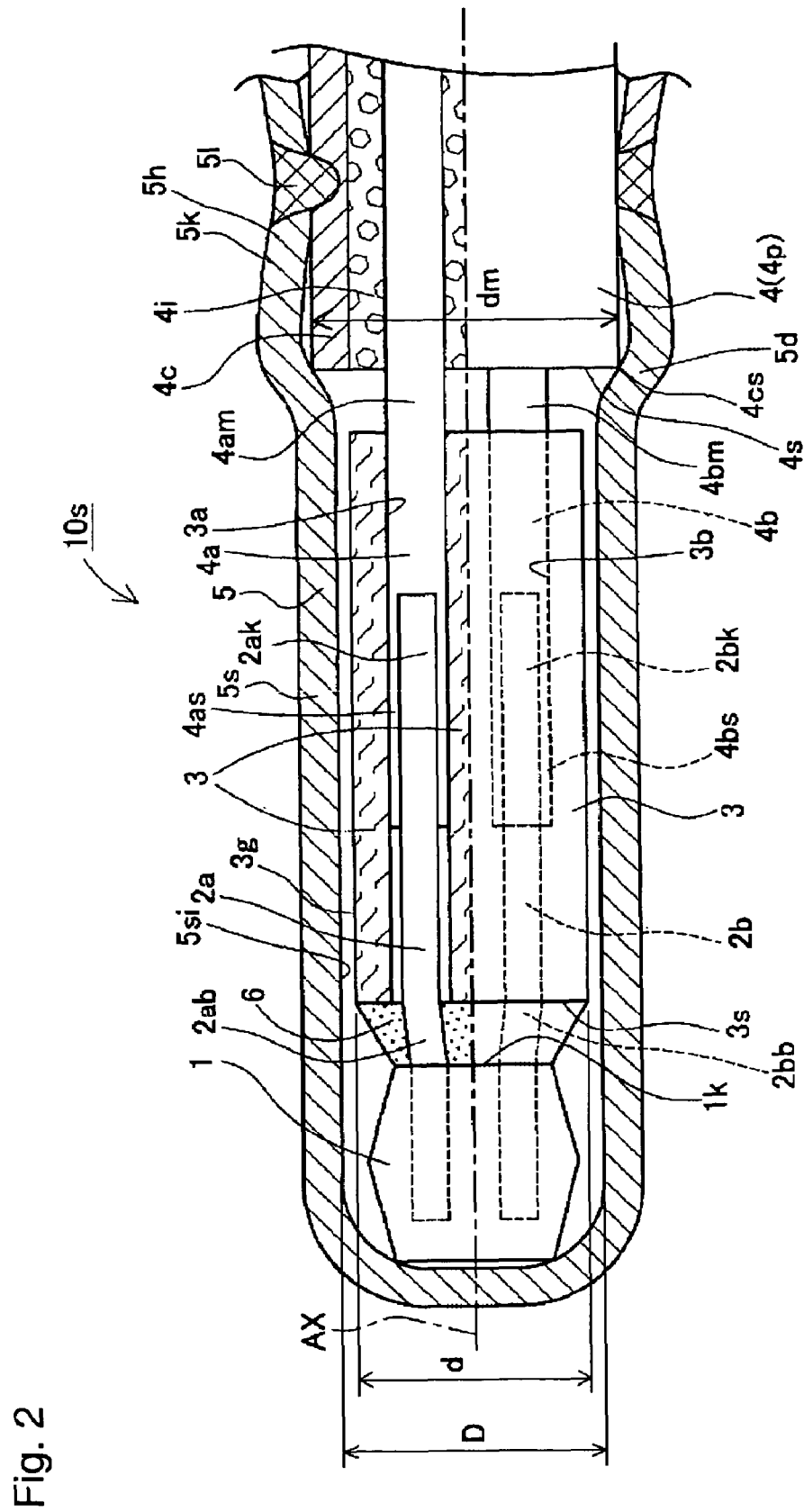
FIG. 2 is an explanatory view showing the structure of the front portion of the temperature sensor according to the first embodiment.

The temperature-sensing portion 10s situated at the tip-end side of the temperature sensor 10 is inserted into a exhaust pipe or coolant pipe, or is located close to an object to measure the temperature of the exhaust gas, coolant, or the object. As illustrated in FIG. 2, the temperature-sensing portion 10s is covered with a stepped cylindrical metallic cover 5 made of stainless steal, etc., and has a closed front end. The metallic cover 5 includes a rear portion 5k having a larger diameter, a front portion 5s situated forward of the rear portion 5k and having a smaller diameter than that of the rear portion 5k, and a step-portion 5d situated therebetween. A thermistor element 1 is accommodated in the front portion 5s (left hand side in FIG. 2). The thermistor element 1 is composed of metal oxide semiconductor whose resistance varies depending on the temperature. In the present embodiment, the thermistor element 1 assumes a hexagonal columnar shape having a small thickness and includes a first conductive wire 2a and a second conductive wire 2b for outputting electrical signals (resistance value). The first and second conductive wires extend from inside to the rear end (right hand side in the drawing) through a rear surface 1k.

Figure 3:
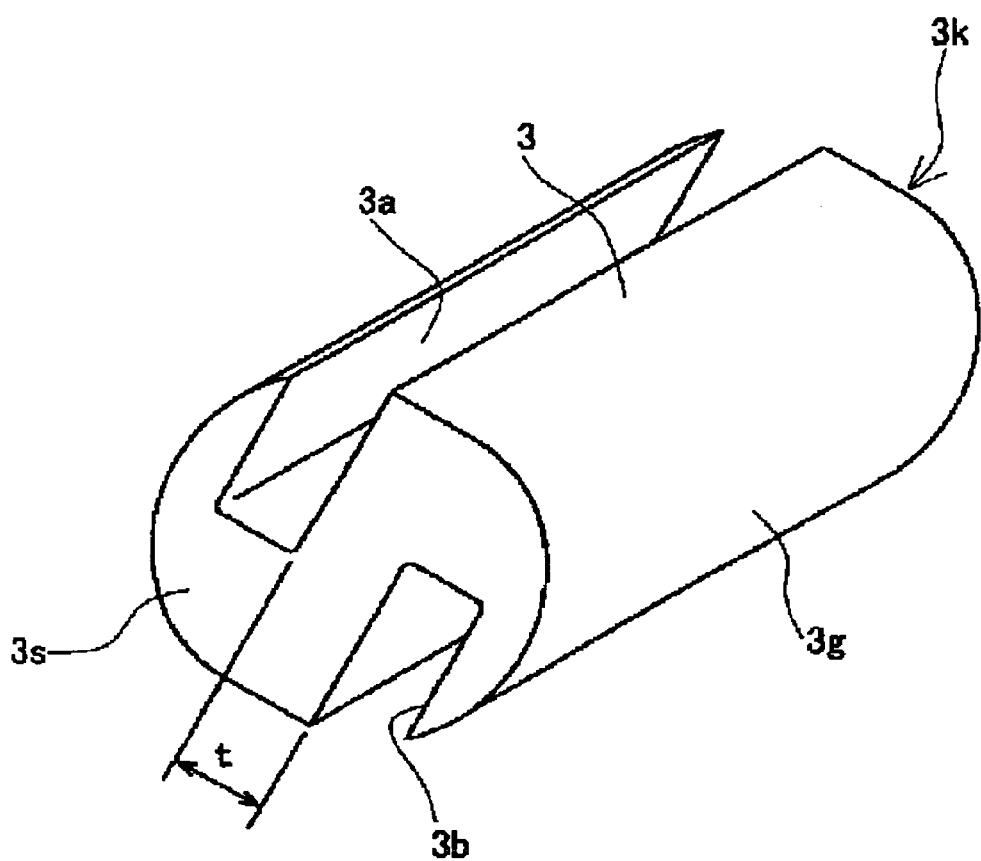
FIG. 3 is a perspective view showing the shape of the insulating holder used in the first, second and third embodiments.

The first conductive wire 2a and second conductive wire 2b are composed of Pt—Rh alloy wire. The rear end of the first conductive wire 2a is inserted and held in the first slit 3a of an insulating holder 3 as illustrated in FIG. 3, and the rear end of the second conductive wire 2b is inserted and held in the second slit 3b of the insulating holder 3. The insulating holder 3 is made of alumina and assumes the form of a generally S-shaped cross section. The first slit 3a and the second slit 3b are formed so as to open in a direction opposite to each other and an insulation distance corresponding to thickness t is provided therebetween. The maximum external diameter d of a circumference 3g of the insulating holder 3 (i.e., a circumscribed circle diameter of the insulating holder 3) is slightly smaller than an internal diameter D of an inner circumferential surface 5si of the front portion 5s in the metallic cover 5 and preferably, the diameters d, D are set to satisfy the relationship: D-d≦0.2 mm.

MI cable 4, in detail a front portion 4p thereof, is disposed in the rear portion 5k of the metallic cover, and a front peripheral rim 4cs of a sheath 4c constituting an external circumference of MI cable 4 contacts the stepped potion 5d of the metallic cover 5. The MI cable 4 includes a cylindrical metallic sheath 4c made of stainless steels, etc., the first and second core wires 4a and 4b extend through the sheath 4c, and inorganic insulating powders 4i such as silica, etc., are compactly filled between the first and second wires 4a and 4b and the sheath 4c. The MI cable 4 has a smaller external diameter dm of the front portion 4p than an inner diameter D of front portion 5s of the metallic cover 5. Accordingly, the front end 4s of the MI cable 4 cannot be inserted into the front portion 5s of the metallic cover 5, and the front peripheral rim 4cs of the sheath 4c contacts the stepped potion 5d.

The metallic cover 5 includes a crimped portion 5h having a reduced diameter and being crimped into the sheath 4c of the MI cable 4 in the rear portion 5k of the metallic cover 5, and a weld portion 5l where the metallic cover 5 and the sheath 4c are laser welded at the rear portion 5k. In this manner, the metallic cover 5 is fixed to MI cable 4.

The first and second core wires 4a and 4b of the MI cable 4 project forward from the front portion 4s thereof. The first core wire 4a is inserted into the first slit 3a of the insulating holder 3 to be held therein, while the second core wire 4b is inserted into the second slit 3b of the insulating holder 3 to be held therein. In the first slit 3a of the insulating holder 3, the rear end 2ak of the first conductive wire 2a and the front portion 4as of the first core wire 4a overlapping the first conductive wire 2a are laser welded. In a similar manner, in the second slit 3b, the rear portion 2bk of the second conductive wire 2b and the front end 4bs of the second core wire 4b overlapping the second conductive wire 2b are laser welded.

As described above, the maximum external diameter d of the insulating holder 3 is slightly smaller than the internal diameter D of the front portion 5s of the metallic cover 5. Therefore, the insulating holder 3 of the present embodiment can limit the vibration range of the temperature sensor 10 when subjected to vibration. However, as described below, without using the cement 6, it is difficult to prevent the thermistor element 1 and the insulating holder 3 from vibrating independently when such unintegrated parts are subjected to external vibration. As a result, the intermediate portion 2ab and 2bb of the first and second conductive wires 2a and 2b that are provided between the rear surface 1k of the thermistor element 1 and the front surface 3s of the insulating holder 3 are liable to break.

In the temperature sensor of the present embodiment, the insulating cement 6, containing alumina as aggregate and silica, is filled between the rear surface 1k of the thermistor element 1 and the front surface 3s of the insulating holder 3, whereby, the thermistor element 1 and the insulating holder 3 are fixed to each other. Accordingly, in the temperature sensor 10 of the present embodiment, the thermistor element 1 and the insulating holder 3 are fixed so as not to vibrate independently. Therefore, the intermediate portions 2ab and 2bb of the first and second conductive wires 2a and 2b are unlikely to break due to reduced load thereon. In addition, because the cement 6 has insulation properties, a short circuit failure is unlikely to occur even though the first and second conductive wires 2a and 2b contact the cement 6.

The internal diameter D of a front portion 5s of the metallic cover 5 is smaller than that of the rear end 5k of the cover and smaller than the external diameter dm of the front end 4s of the MI cable 4. Since the thermistor element 1 is accommodated in the front portion 5s, the thermal capacity in the vicinity thereof is small. Further, the small distance between the metallic cover 5 and the thermistor element 1 results in quick response of the temperature sensor 10 to ambient temperature changes.

Next, the intermediate portion 10m of the temperature sensor 10 is described. The MI cable 4 of the temperature sensor 10 is inserted in a metal shell 11 at the intermediate portion 10m. The metal shell 11 includes a cylindrical stem portion 11j, a circular flange portion 11f provided forward of the stem portion 11j (right side in FIG. 1) and projecting outwardly in a radial direction. A sealing surface 111s having a tapered surface, in which the external diameter is reduced toward the front end, is formed on the outer circumference of the flange portion 11f. An intermediate portion 4m of the MI cable 4 is hermetically attached to the metal shell 11 by means of laser welding after being inserted into a through hole 11*p* of the metal shell 11.

Furthermore, an external cylinder 12 surrounds the outer circumference of the stem portion 11*j* of the metal shell 11 and extends rearward. The stem portion 11*j* of the metal shell 11 and the front portion 12*s* of the external cylinder 12 are, for example, hermetically joined by means of laser welding in all directions thereof.

In addition, the intermediate portion 10*m* of the temperature sensor 10 further includes a threaded clamp 13 surrounding the outside of the stem portion 11*j* of the metal shell 11 and the external cylinder 12 (vertical direction in FIG. 1). The threaded clamp 13 has a hexagonal tool engagement portion 13*h* for engaging with a tool such as a wrench, and a male screw portion 13*q* positioned forward of the tool engagement portion 13*h*.

As just described, the intermediate portion 10*m* of the temperature sensor 10 has the above-described metal shell 11 and the threaded clamp 13. Therefore, a sealing surface 11*s* of the metal shell 11 is positioned so as to touch a tapered surface formed on, for example, a mounting portion in an exhaust pipe (not illustrated) of an automobile. Pressing the sealed surface 11*s* of the metal shell 11 to the tapered surface, the male screw portion of the threaded clamp 13 is screwed into a female screw formed in the exhaust pipe so that the temperature sensor 10 can be hermetically attached to the exhaust pipe.

Further, in a rear portion 10*k* of the temperature sensor 10, a rear portion 4*ak* of the first core wire 4*a* projecting rearward from the rear face 4*k* of the MI cable 4 and a core wire 14*a* of the first lead wire 14 are crimped and fixed by means of a crimping terminal 16. Furthermore, the first core wire 4*a*, the core wire 14*a* and the crimping terminal 16 are covered with an insulating tube 17. In a similar manner, a rear portion 4*bk* of the second core wire 4*b* projecting from the MI cable 4 and a core wire 15*a* of the second lead wire 15 are crimped and fixed by means of the crimping terminal 16. Then, the second core wire 4*b*, the core wire 15*a* and the crimping terminal 16 are covered with an insulating tube 17. The first lead wire 14 and the second lead wire 15 extend to the exterior of the external cylinder 12 via through holes 18*a* and 18*b* of grommet 18.

As described above, in the temperature-sensing portion 10*s* in the front portion of the temperature sensor 10, the thermistor element 1 and the insulating holder 3 are accommodated in the metallic cover 5 and are fixed to each other by means of the cement 6. Consequently, the first and second conductive wires 2*a* and 2*b*, especially, the intermediate portions 2*ab* and 2*bb* situated between the thermistor element 1 and the insulating holder 3 where the cement 6 is filled, are protected from breakage due to vibrations of the temperature sensor 10. Specifically, in the present embodiment, since the cement 6 is filled between the intermediate portions 2*ab* and 2*bb* of the first and second conductive wires 2*a* and 2*b* to surround the same, bending and breaking failures are unlikely to occur in the intermediate portions 2*ab* and 2*bb*.

Notably, in the present embodiment, the metallic cover 5 has a stepped shape and an inner diameter D of the front portion 5*s* thereof is smaller than that of the rear portion 5*k* and the external diameter dm of the front portion 4*p* of the cable. As a result, the thermal capacity in the vicinity of the thermistor element 1 is reduced which allows the thermistor element 1 (i.e. temperature sensor element 10) to promptly respond to ambient temperature changes.

Figure 4:
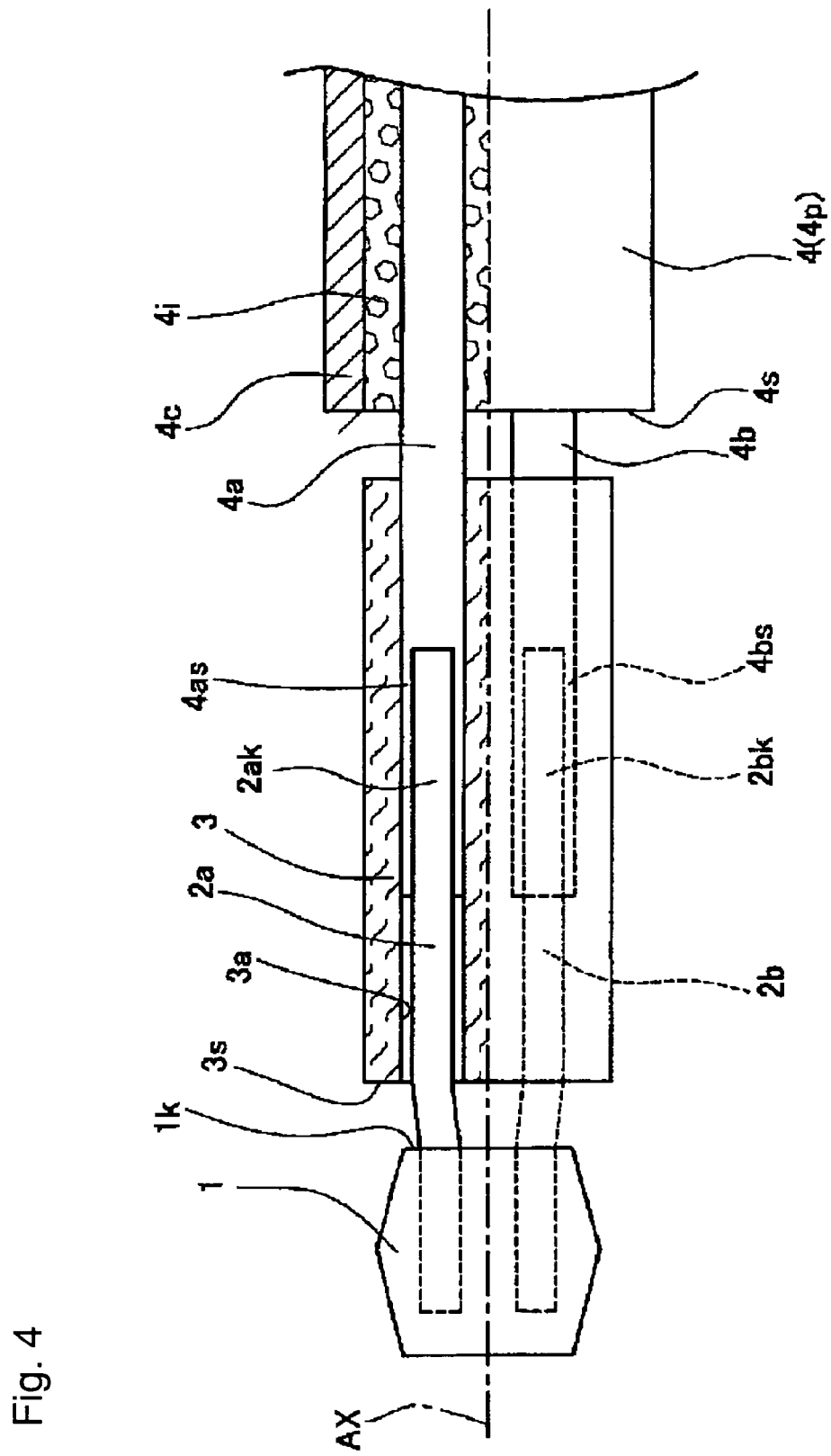
FIG. 4 is an explanatory view showing a state in which the first and second conductive wires of the thermistor element and the first and second core wires of the MI cable are electrically connected and held in the insulating holder according to a production process of the temperature sensor of the first embodiment.

The temperature sensor 10 of the present embodiment can be produced according to the following method. In advance, the following items are prepared: the thermistor element 1 having the first and second conductive wires 2*a* and 2*b* projecting from the rear surface 1*k*; the MI cable 4 having the first and second core wires 4*a* and 4*b* projecting from the front portion of the cable; the insulating holder 3 as illustrated in FIG. 3; and the metal shell 11. First, the MI cable 4 is inserted into the metal shell 11 and fixed by crimping and laser welding. Next, as illustrated in FIG. 4, the first conductive wire 2*a* and the first core wire 4*a* are inserted into the first slit 3*a* of the insulating holder 3. In a similar manner, the second conductive wire 2*b* and the second core wire 4*b* are inserted into the second slit 3*b* of the insulating holder 3. Further, the rear portion 2*ab* of the first conductive wire 2*a* and the front portion 4*as* of the first core wire 4*a* that overlap in the first slit 3*a* are connected to each other by means of laser welding. Correspondingly, the rear portion 2*bb* of the second conductive wire 2*b* and the front portion 4*bs* of the second core wire 4*b* that overlap in the second slit 3*b* are connected to each other by means of laser welding.

Figure 5:
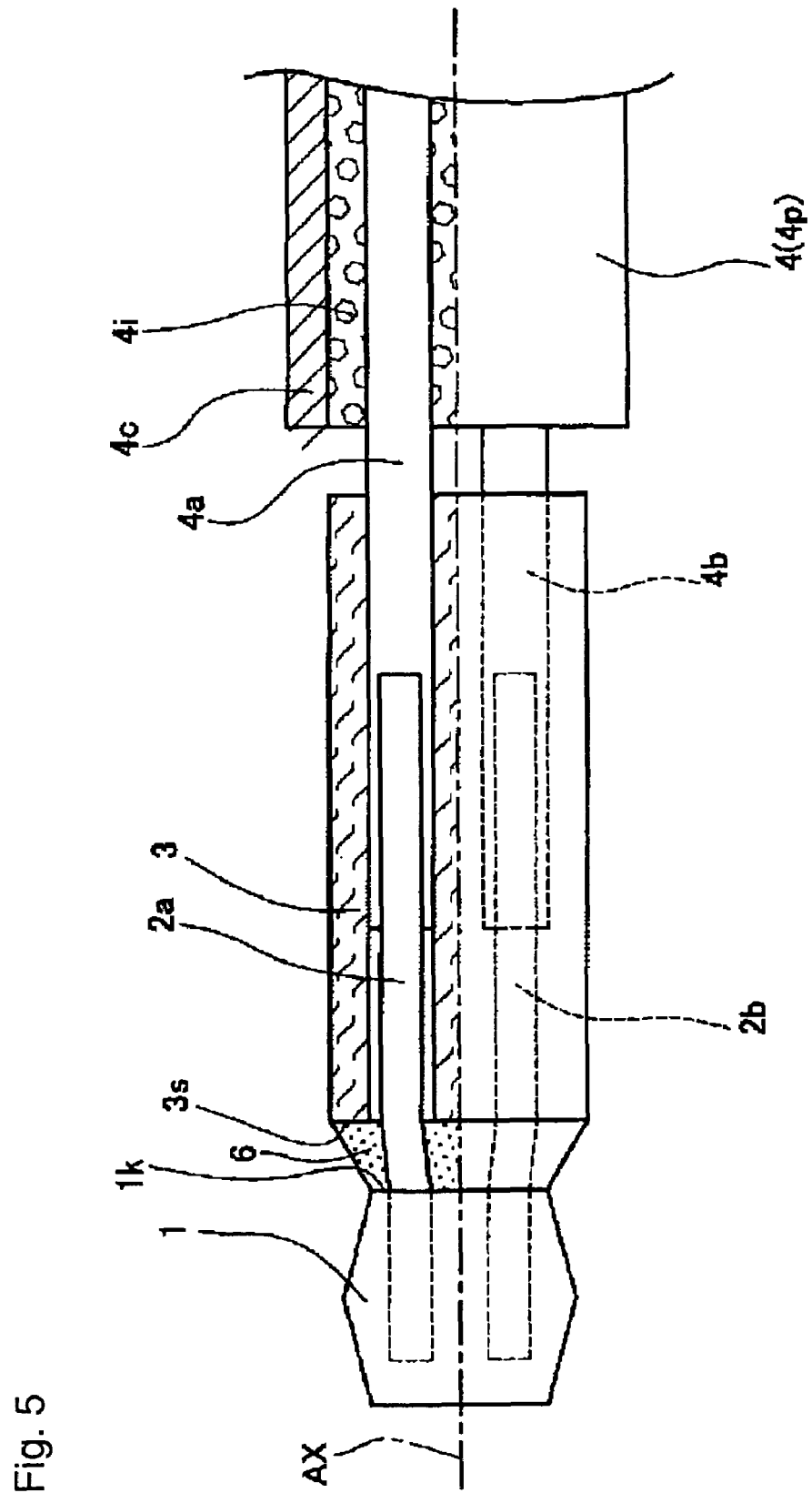
FIG. 5 is an explanatory view showing a state in which the thermistor element and the insulating holder are fixed to each other by cement according to a production process of the temperature sensor of the first embodiment.

Subsequently, unhardened cement 6 is disposed in the gap between the rear surface 1*k* of the thermistor element 1 and the front surface 3*s* of the insulating holder 3 as illustrated in FIG. 5. In detail, the unhardened cement 6 is filled in the gap between the rear surface 1*k* and the front surface 3*s* by means of a dispenser (not illustrated), whereby, the intermediate portion 2*ab* and 2*bb* of the first and second conductive wires 2*a* and 2*b* situated in the gap are surrounded by the cement 6.

Next, the cement 6 is heated to solidify the same. In detail, the cement 6 is heated at 900° C. for 5 hours in order to fix the thermistor element 1 and the insulating holder 3 together. Excess cement 6 overflowing from the rear surface 1*k* or from the front surface 3*s* is preferably removed before or after the solidification process, so as to prevent it from being in the way at the following insertion process to the metallic cover 5.

Figure 6:
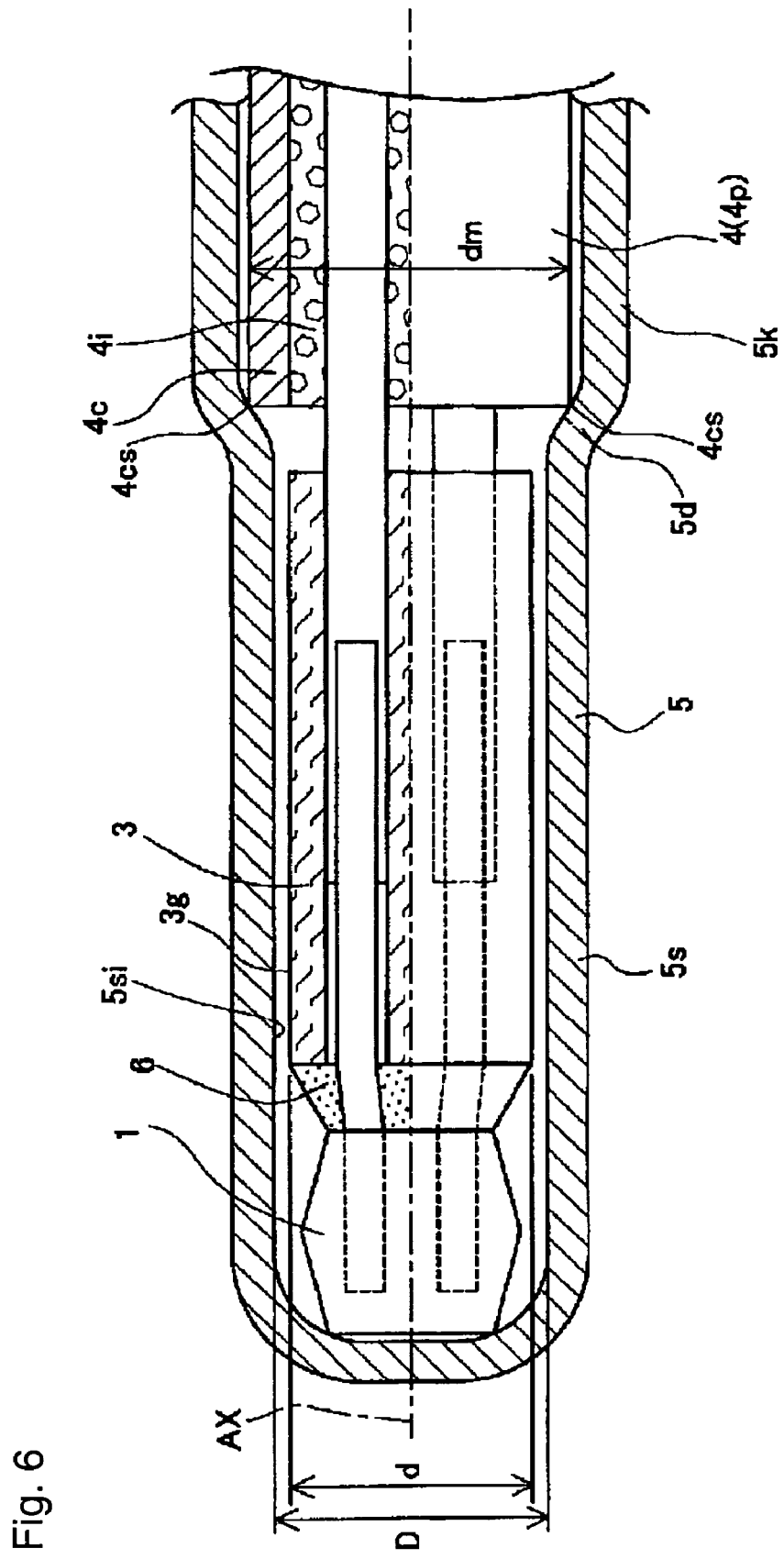
FIG. 6 is an explanatory view showing a state during assembly of the thermistor element, when the insulating holder is inserted in the metallic cover according to a production process of the temperature sensor of the first embodiment.

Subsequently, as illustrated in FIG. 6, the thermistor element 1, the insulating holder 3, and the front portion 4*p* of the MI cable 4 are inserted into the metallic cover 5. 0 Preferably, the front peripheral rim 4*cs* of a sheath 4*c* in the MI cable 4 is fitted to a stepped portion 5*d* situated between the rear portion 5*k* and the front portion 5*s* of the metallic cover 5 to set its position.

Notably, as illustrated in FIG. 6, the maximum diameter d of the outer circumferential surface 3*g* of the insulating holder 3 is slightly larger than the inner diameter D of the front portion 5*s* of the metallic cover 5 in order to facilitate insertion thereof.

As illustrated in FIG. 2, a part of the rear portion 5*k* of the metallic cover 5 is crimped inwardly in a radial direction by reducing its diameter so as to create a crimped portion 5*h* preliminarily fixing to the front portion 4*p* of the MI cable 4. Further, a part of the crimped portion 5*h* and the sheath 4*c* are laser welded at the entire circumference thereof. In this manner, a temperature-sensing portion 10*s* having a thermistor element 1, which is hermetically sealed and maintained liquid-proof in the metallic cover 5, is formed in the front portion 4*p* of the MI cable 4.

In a method for producing temperature sensor 10 having this type of temperature-sensing portion 10*s*, remaining production methods relating to the intermediate portion 10*m* and the rear portion 10*k*, etc., are substantially the same as conventionally known methods, and therefore, explanation thereof will be omitted.

2. Second Embodiment

Next, the second embodiment of the present invention is explained with reference to FIG. 7. In the temperature sensor 10 of the first embodiment, a thermistor element 1 and an insulating holder 3 were only fixed to each other by cement 6, which is filled therebetween but is not in contact with a metallic cover 5. On the other hand, a temperature sensor 210 of the second embodiment is mainly different from the first embodiment in that cement 26 is filled in the front portion 5s of the metallic cover 5. Accordingly, explanation will be given primarily on the differences but will be omitted or simplified on similarities with the first embodiment.

Figure 7:
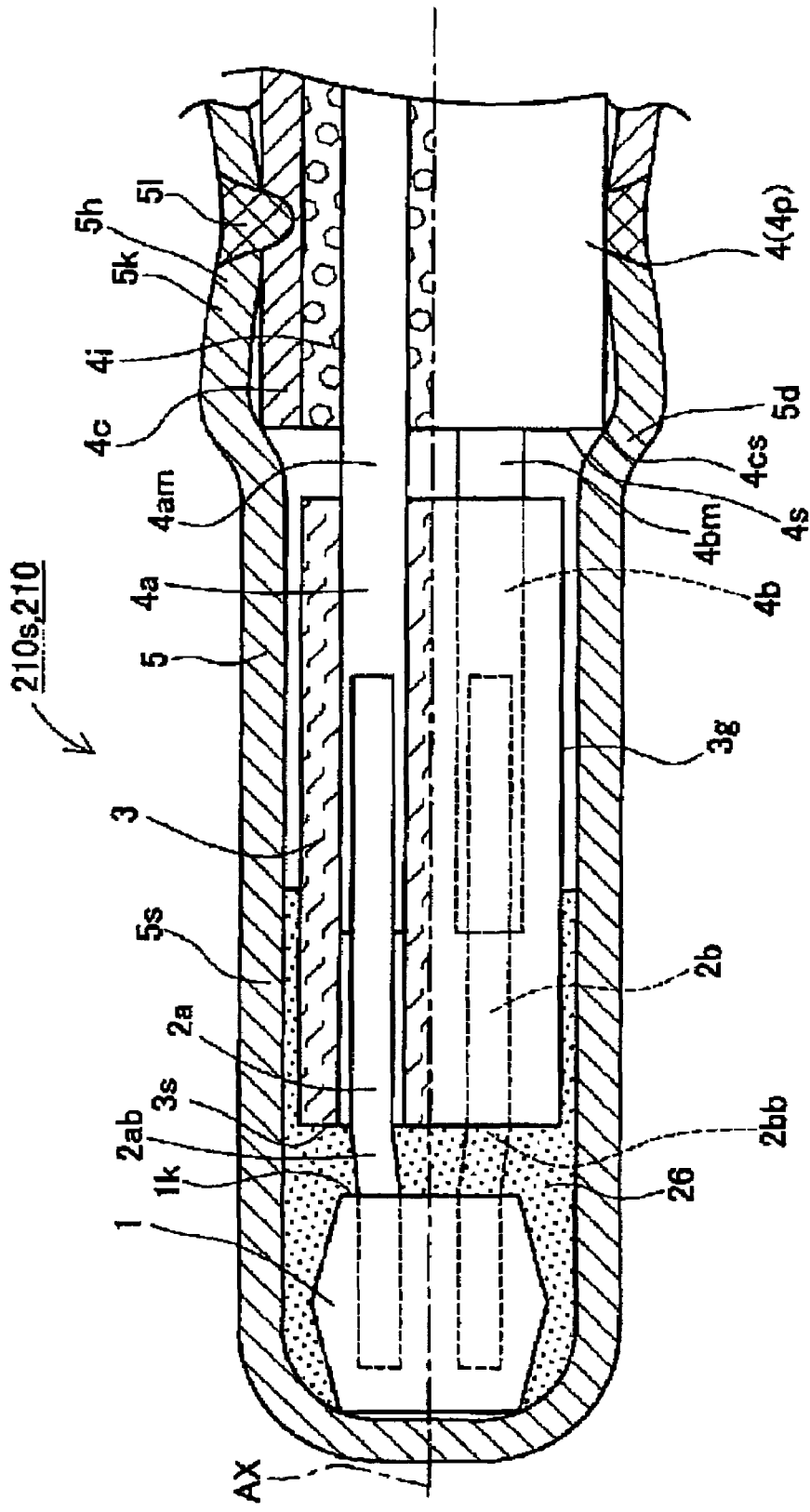
FIG. 7 is an explanatory view showing the structure of a front portion of the temperature sensor according to a second embodiment of the invention.

A structure of the temperature-sensing portion 210s of the temperature sensor 210 of the second embodiment is illustrated in FIG. 7. As understood by the illustration, the thermistor element 1, the first and second conductive wires 2a and 2b, an insulating holder 3, MI cable 4 and a metallic cover 5 have the similar shape and arrangement as those of the temperature sensor 10 of the first embodiment. However, in the temperature sensor 210 of the second embodiment, the cement 26 is filled in the front portion 5s of the metallic cover 5. Therefore, the cement 26 is not only filled in the gap between the rear surface 1k of the thermistor element 1 and the front surface 3s of the insulating holder 3, but also surrounds the thermistor element 1 and extends to the front end (left hand side in the illustration) of the circumferential surface 3g of the insulating holder 3. The thermistor element 1 is embedded in the cement 26 and fixed to the metallic cover 5.

Because the cement 26 is arranged as explained above in the temperature sensor 210, the thermistor element 1 and the insulating holder 3 are not only fixed to each other but also to the front portion 5s of the metallic cover 5. Therefore, even when the temperature sensor 210 is subjected to an external stress, the thermistor element 1 and the insulating holder 3 do not vibrate independently in the front portion 5s of the metallic cover 5. As a result, the first and second conductive wires 2a and 2b, including intermediate portions 2ab and 2bb, are protected from being broken.

Compared to the temperature sensor 10 of the first embodiment, the temperature sensor 210 of the second embodiment provides higher reliability against vibration (vibration tolerance). Further, in the temperature sensor 210 of the second embodiment, since the cement 26 is filled between the thermistor element 1 and the metallic cover 5, heat can easily conduct from the metallic cover 5 to the thermistor element 1. Thus, the thermistor element 1 (i.e. the temperature sensor 210) exhibits fast response to ambient temperature changes.

Notably, a production method for producing the temperature sensor 210 (temperature-sensing portion 210s) of the second embodiment is preferably implemented as follows. In advance, the following items are prepared: the thermistor element 1 including a first conductive wire 2a connected to a the first core wire 4a, and a second conductive wire 2b connected to a second core wire 4b; an insulating holder 3; and a MI cable 4 fixed to a metallic shell 11. Similar to the first embodiment, a small amount of unhardened cement 26 is disposed in the gap between the rear surface 1k of the thermistor element 1 and the front surface 3s of the insulating holder 3, and then solidified. Then, the assembly of the thermistor element 1 and the insulating holder 3 is inserted into the front portion 5s of the metallic cover 5 in which additional unhardened cement 26 has previously been filled in. Next, the additional unhardened cement 26 is solidified so that the thermistor element 1 and the insulating holder 3 are not only fixed to each other but also to the metallic cover 5 by means of cement 26. Subsequently, similar to the temperature sensor 10 of the first embodiment, the rear portion 5k of the metallic cover is crimped and laser welded. The rest of the production procedures are the same as those of known temperature sensors.

3. Third Embodiment

Next, the third embodiment of the present invention is explained with reference to FIG. 8. In the temperature sensor 10 of the first embodiment, a thermistor element 1 and an insulating holder 3 were fixed to each other only by cement 6 filled therebetween. In other words, nothing was present between an insulating holder 3 and a MI cable 4. As a result, the intermediate portions 4am and 4bm of the first and second core wires 4a and 4b were exposed (see FIG. 2), and so was the temperature sensor 210 of the second embodiment (see FIG. 7). On the other hand, in a temperature sensor 310 of the third embodiment, the insulating holder 3 and the MI cable 4 are fixed by means of cement 36. Accordingly, explanation will be given primarily on the differences compared to the temperature sensor 10 of the first embodiment, but will be omitted or simplified on the similarities.

Figure 8:
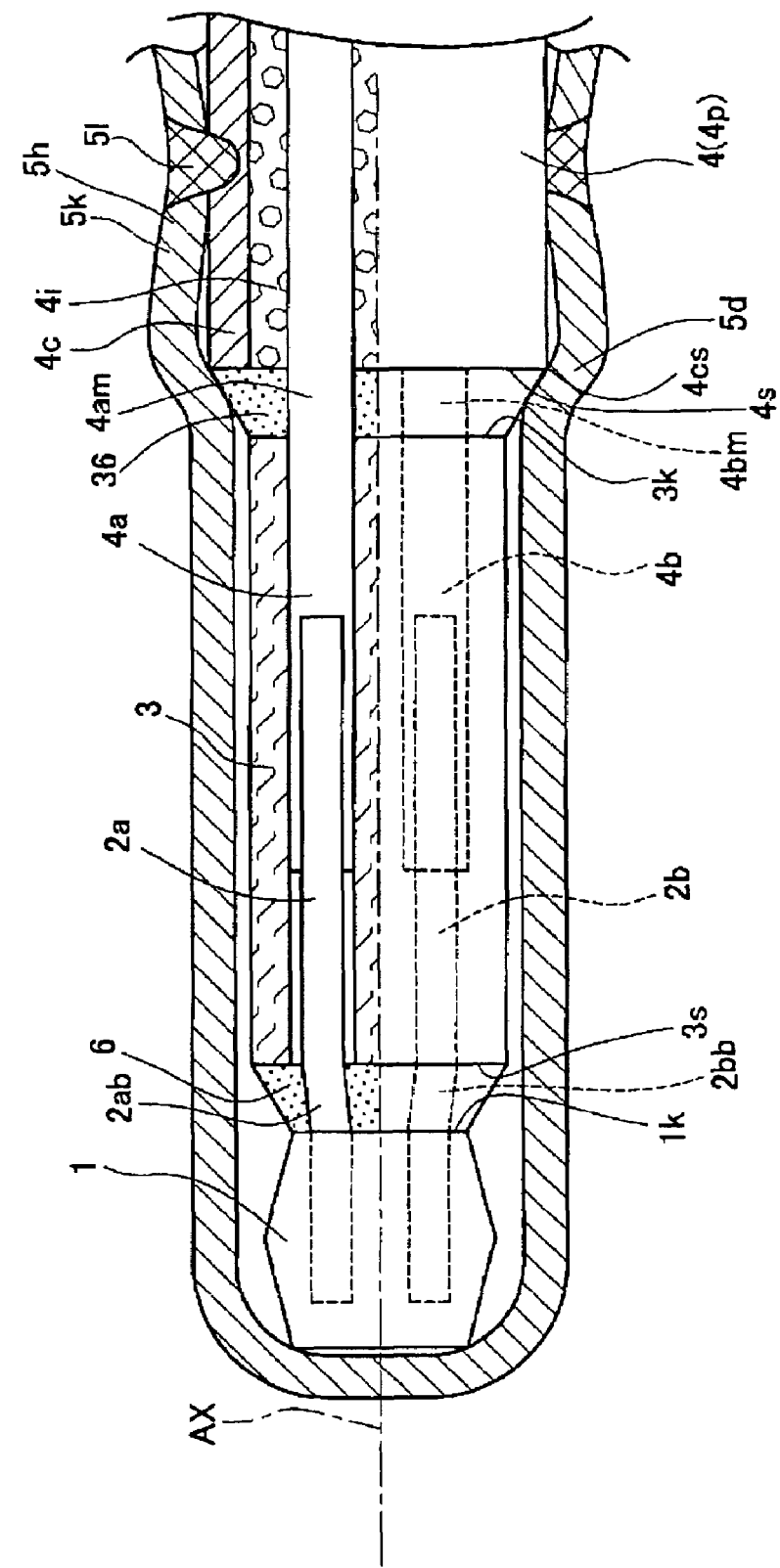
FIG. 8 is an explanatory view showing the structure of a front portion of the temperature sensor according to a third embodiment of the invention.

In the temperature sensor 310 of the third embodiment, a structure of the temperature-sensing portion 310s is illustrated in FIG. 8. As understood by FIG. 8, the thermistor element 1, the first and second conductive wires 2a and 2b, the insulating holder 3, the MI cable 4 and the metallic cover 5 have the same shapes and dispositions as those of the temperature sensor 10 of the first embodiment.

However, the temperature sensor 310 of the third embodiment includes not only cement 6 but also cement 36 filled between the insulating holder 3 and the MI cable 4. Therefore, similar to the first embodiment, the thermistor element 1 and the insulating holder 3 are fixed to each other by means of the cement 6. Further, the insulating holder 3 and the front portion 4s of the MI cable 4 are fixed to each other by means of cement 36.

Because cement 6 and 36 are arranged in the temperature sensor as described above, the thermistor element 1 and the insulating holder 3 are fixed to each other, and the insulating holder 3 and the MI cable 4 are also fixed. Therefore, even though the temperature sensor 310 is subjected to external vibration, the thermistor element 1 and the insulating holder 3 do not vibrate independently in the front portion 5s of the metallic cover 5. As a result, the first and second conductive wires 2a and 2b are protected from breakage in a region between intermediate portions 2ab and 2bb. Furthermore, the insulating holder 3 and the front portion 4s of the NI cable 4 are integrated, whereby independent vibration thereof is avoided. Consequently, the first and second core wires 4a and 4b are protected from breakage at the intermediate portions 4am and 4bm situated between the rear end surface 3k of the insulating holder 3 and the front end surface 4s of the MI cable 4. Compared to the temperature sensor 10 of the first embodiment, the temperature sensor 310 of the third embodiment exhibits further improved reliability in tolerating vibration. Specifically, since the intermediate portions 4am and 4bm of the first and second core wires 4a and 4b are surrounded by cement 36 in the third embodiment, the intermediate portions are unlikely to bend or break.

Notably, in a method for producing the temperature sensor 310 (temperature-sensing portion 310s) of the third embodiment, unhardened cement 6 is disposed in a gap between the rear surface 1k of the thermistor element 1 and the front surface 3s of the insulating holder 3. Before or after that, unhardened cement 36 is disposed in the gap between the rear surface 3k of the insulating holder 3 and the front surface 4s of the MI cable 4. Sequentially, the cements 6 and 36 are solidified by heating. Then, similar to the temperature sensor 10 of the first embodiment, an assembly of the thermistor element 1 and the insulating holder 3 is inserted into the metallic cover 5, and subsequently the rear portion 5k of the metallic cover 5 is crimped and laser welded. The rest of the production procedures are the same as those of known temperature sensors.

4. First, Second and Third Modifications

Figure 9A:
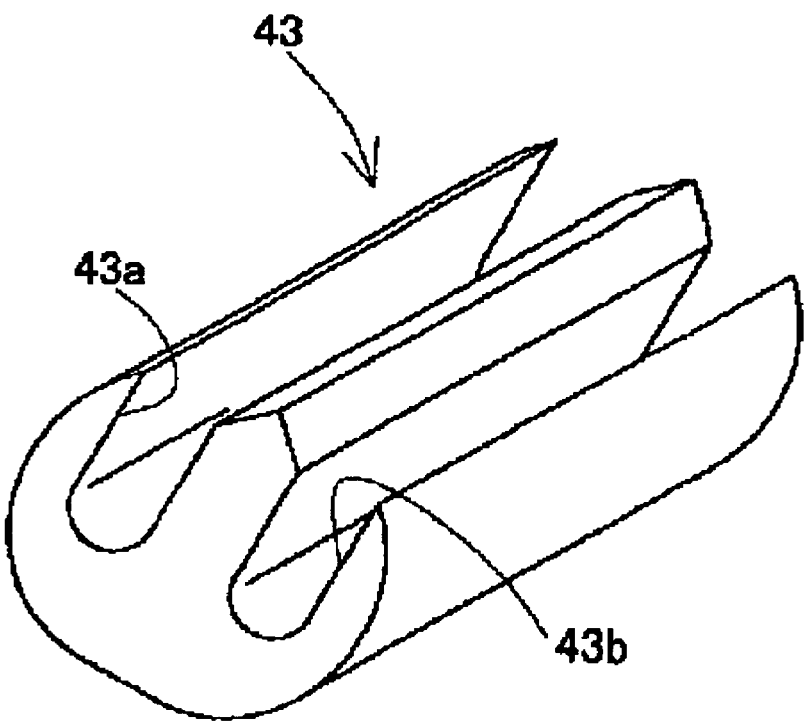
FIGS. 9A to 9C are perspective views showing other insulating holder shapes: Sectional "E" shape (FIG. 9A), Sectional "H" shape (FIG. 9B), and Slotted shape (FIG. 9C).
Figure 9B:
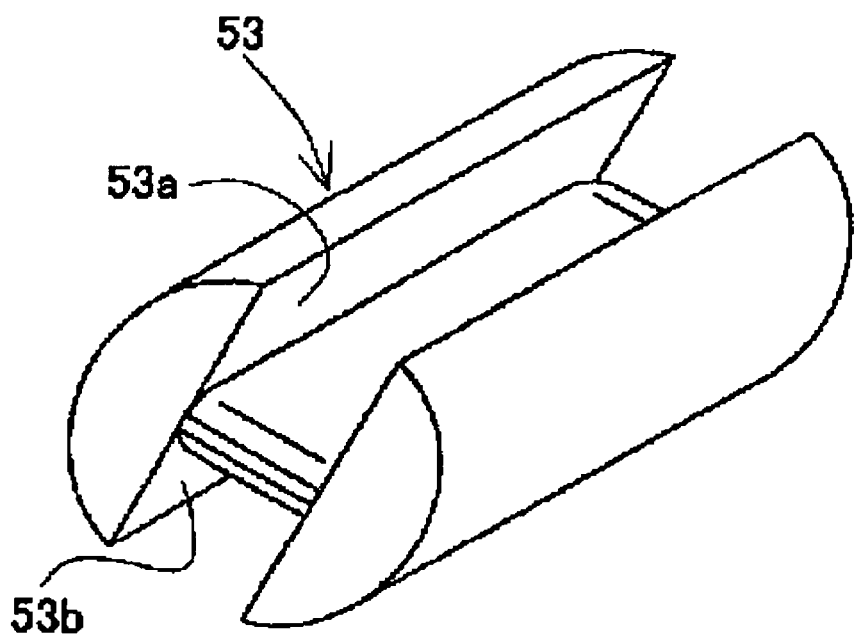
Figure 9C:
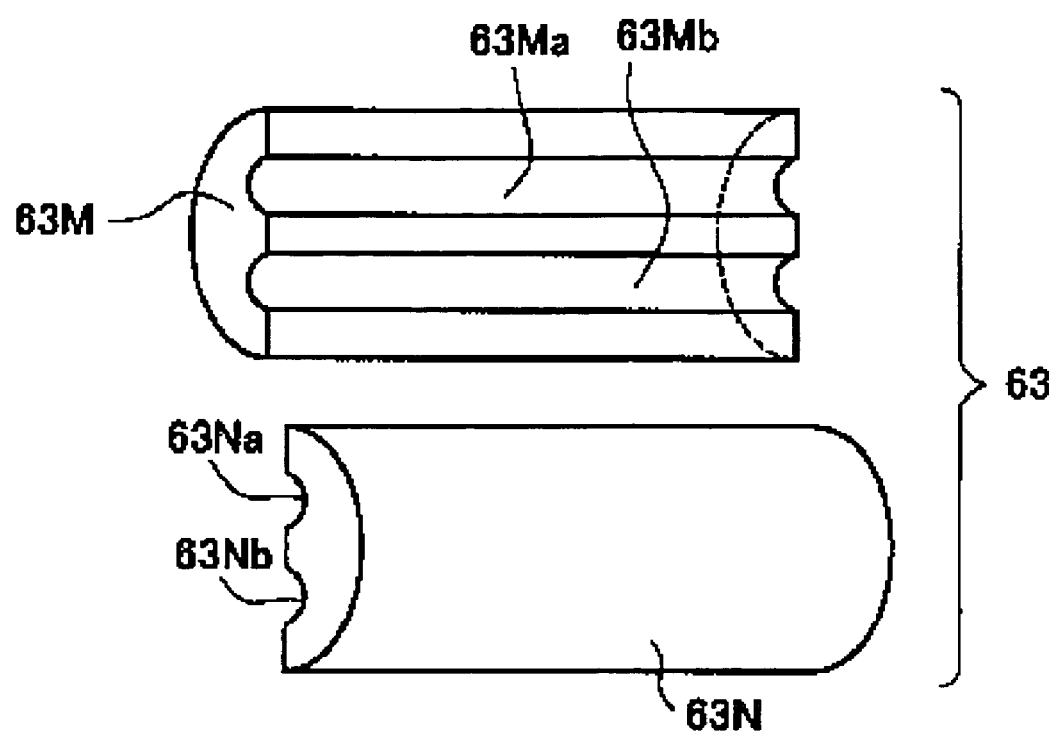

The above embodiments 1 to 3 adopt an insulating holder 3 illustrated in FIG. 3, however, for example, different kinds of insulating holders as illustrated in FIG. 9 can be used. More specifically, an insulating holder 43 according to the first modification (see FIG. 9A) has first and second slits 43a and 43b which open in the same, direction (upward in FIG. 9A) with a sectional "E"-shape.

Further, an insulating holder 53 according to a second modification (see FIG. 9B) has first and second slits 53a and 53b which open in a direction opposite to each other (upward in FIG. 9) with a sectional "H"-shape.

Furthermore, an insulating holder 63 according to a third modification (see FIG. 9C) is composed of two members, first and second insulating holders 63M and 63N, which are integrated as a single cylindrical unit having a pair of slots. The first insulating holder 63M includes first and second grooves 63Ma and 63Mb, and the second insulating holder 63N includes first and second grooves 63Na and 63Nb. The first grooves 63Ma and 63Na form a through hole in which the first conductive wire 2a and the first core wire 4a are to be positioned. The second grooves 63Mb and 63Nb form a through hole in which the second conductive wire 2b and the second core wire 4b are to be positioned.

The present invention has been described in accordance with the first to third embodiments. Needless to say, the present invention is not limited to these embodiments, and may be practiced in a modified from without departing from the scope of the invention.

For example, in the third embodiment, similar to the first embodiment, cement 6 is arranged between the thermistor element 1 and the insulating holder 3, and cement 36 is provided between the insulating holder 3 and the MI cable 4 (see FIG. 8). However, similar to the temperature sensor 210 of the second embodiment (see FIG. 7), an assembly of the insulating holder 3 and MI cable 4 with cement 36 provided therebetween can be applied to a sensor in which thermistor element 1 is embedded in the front portion 5s of the metallic cover 5 by a relatively large amount of cement 26.

Further, in the second embodiment, the thermistor element 1 is surrounded by cement 26 to embed the thermistor element 1. Considering the vibration tolerance of the temperature sensor, use of the cement can be limited to fixing the thermistor 1 and insulating holder 3 together, and the cement need not necessarily surround the entire circumference of the thermistor element 1. However, in order to increase thermal conduction from the metallic cover 5 to the thermistor element 1, it is preferable to fill the gap between the thermistor element 1 and the metallic cover 5 with cement so as to quicken response of the temperature sensor.

On the other hand, in the second embodiment, approximately one third of the outer peripheral of insulating holder 3 along the axis AX from the tip-end-side is embedded in cement 26. Compared to the amount of cement 26 used in the second embodiment, the amount of cement can be increased so as to fill more of the gap between the insulating holder 3 and metallic cover 5. With this method, the insulating holder 3 can be fixed more effectively and the vibration tolerance thereof can be improved. However, since heat conducts through the metallic cover 5 to the insulating holder 3 or further to the MI cable 4 without going through the thermistor element 1, the responsiveness of the temperature sensor is prone to deteriorate. Preferably, the amount of cement 26 is limited to the least necessary to fix the thermistor element 1 and the insulating holder 3 or to attach the insulating holder 3 to the metallic cover 5 so as not to degrade responsiveness of the temperature sensor.

It should further be apparent to those skilled in the art that various changes in form and detail of the invention as shown and described above may be made. It is intended that such changes be included within the spirit and scope of the claims appended hereto.

This application is based on Japanese Patent Application No. 2004-210500, filed Jul. 16, 2004, incorporated herein by reference in its entirety.

What is claimed is:

1. A temperature sensor having an axis and a front end and a rear end situated along said axis, said temperature sensor comprising:
 a cylindrical metallic cover having a closed front end;
 a temperature sensor element accommodated in the front portion of said metallic cover;
 one or more conductive wires extending rearwards of the temperature sensor element and transmitting a signal therefrom;
 a MI cable located in a rear end of the temperature sensor element, including at least core wires therein corresponding to said one or more conductive wires, respectively, and said MI cable having a front end inserted into the metallic cover; and
 an insulating holder located between the rear end of the temperature sensor element and the front end of the MI cable in the metallic cover, and holding the conductive wires and the core wires extending forward of the MI cable,
 wherein the conductive wires and the corresponding core wires are connected to each other in the insulating holder;
 wherein an internal diameter of the front portion of the metallic cover is smaller than an external diameter of the front end of the MI cable;
 wherein the temperature sensor element and the insulating holder are fixed to each other by means of a first adhesive material provided at least therebetween; and
 wherein said first adhesive material is electrically insulating and surrounds at least a portion of the conductive wires situated between a rear end face of the temperature sensor element and a front end face of the insulating holder, and
 wherein the front end face of the insulating holder is situated to the rear of the rear end face of the temperature sensor element along said axis.

2. The temperature sensor according to claim 1, wherein the insulating holder and the MI cable are fixed by means of a second adhesive material provided at least therebetween.

3. The temperature sensor according to claim 1, wherein said temperature sensor element and said insulating holder are fixed to the metallic cover by means of said first adhesive material provided among the metallic cover, the temperature sensor element and the insulating holder.

4. The temperature sensor according to claim 3, wherein the temperature sensor element is embedded in the first adhesive material and fixed to the metallic cover.

5. A method for producing a temperature sensor having an axis and a front end and a rear end situated along said axis, said temperature sensor comprising:
 a cylindrical shaped metallic cover having a closed front end and a bottom;

a temperature sensor element accommodated in the front portion of said metallic cover;
one or more conductive wires extending rearwards of the temperature sensor element and transmitting a signal therefrom;
a MI cable located in the rear end of the temperature sensor element, including at least core wires therein corresponding to said one or more conductive wires, respectively, and said MI cable having a front end inserted into the metallic cover; and
an insulating holder located between the rear end of the temperature sensor element and the front end of the MI cable and the metallic cover, and holding the conductive wires and the core wires extending forward of the MI cable,
wherein the conductive wires and the corresponding core wires are connected to each other in the insulating holder;
wherein an internal diameter of the front portion of the metallic cover is smaller than an external diameter of the front end of the MI cable;
wherein the temperature sensor element and the insulating holder are fixed to each other by means of a first adhesive material provided at least therebetween; and
wherein said first adhesive material is electrically insulating and surrounds at least a portion of the conductive wires situated between a rear end face of the temperature sensor element and a front end face of the insulating holder, and
wherein the front end face of the insulating holder is situated to the rear of the rear end face of the temperature sensor element along said axis,
wherein said method comprises:
providing an unhardened adhesive material between at least a rear end face of the temperature sensor element and a front end face of the insulating holder in which the conductive wires are positioned,
fixing the temperature sensor element and the insulating holder to each other by hardening the adhesive material provided therebetween, and
inserting the temperature sensor element and the insulating holder into the metallic cover.

6. A temperature sensor having an axis and a front end and a rear end situated along said axis, said temperature sensor comprising:
a cylindrical metallic cover having a closed front end;
a temperature sensor element accommodated in the front portion of said metallic cover;
one or more conductive wires extending rearwards of the temperature sensor element and transmitting a signal therefrom;
a MI cable located in a rear end of the temperature sensor element, including at least core wires therein corresponding to said one or more conductive wires, respectively, and said MI cable having a front end inserted into the metallic cover; and
an insulating holder located between the rear end of the temperature sensor element and the front end of the MI cable in the metallic cover, and holding the conductive wires and the core wires extending forward of the MI cable,
wherein the conductive wires and the corresponding core wires are connected to each other in the insulating holder;
wherein an internal diameter of the front portion of the metallic cover is smaller than an external diameter of the front end of the MI cable;
wherein the temperature sensor element and the insulating holder are fixed to each other by means of a first adhesive material provided at least therebetween; and
wherein said first adhesive material is electrically insulating and surrounds at least a portion of the conductive wires situated between a rear end face of the temperature sensor element and a front end face of the insulating holder, and
wherein said temperature sensor element and said insulating holder are fixed to the metallic cover by means of said first adhesive material provided among the metallic cover, the temperature sensor element and the insulating holder.

7. The temperature sensor according to claim 6, wherein the temperature sensor element is embedded in the first adhesive material and fixed to the metallic cover.

* * * * *